Patented Apr. 25, 1950

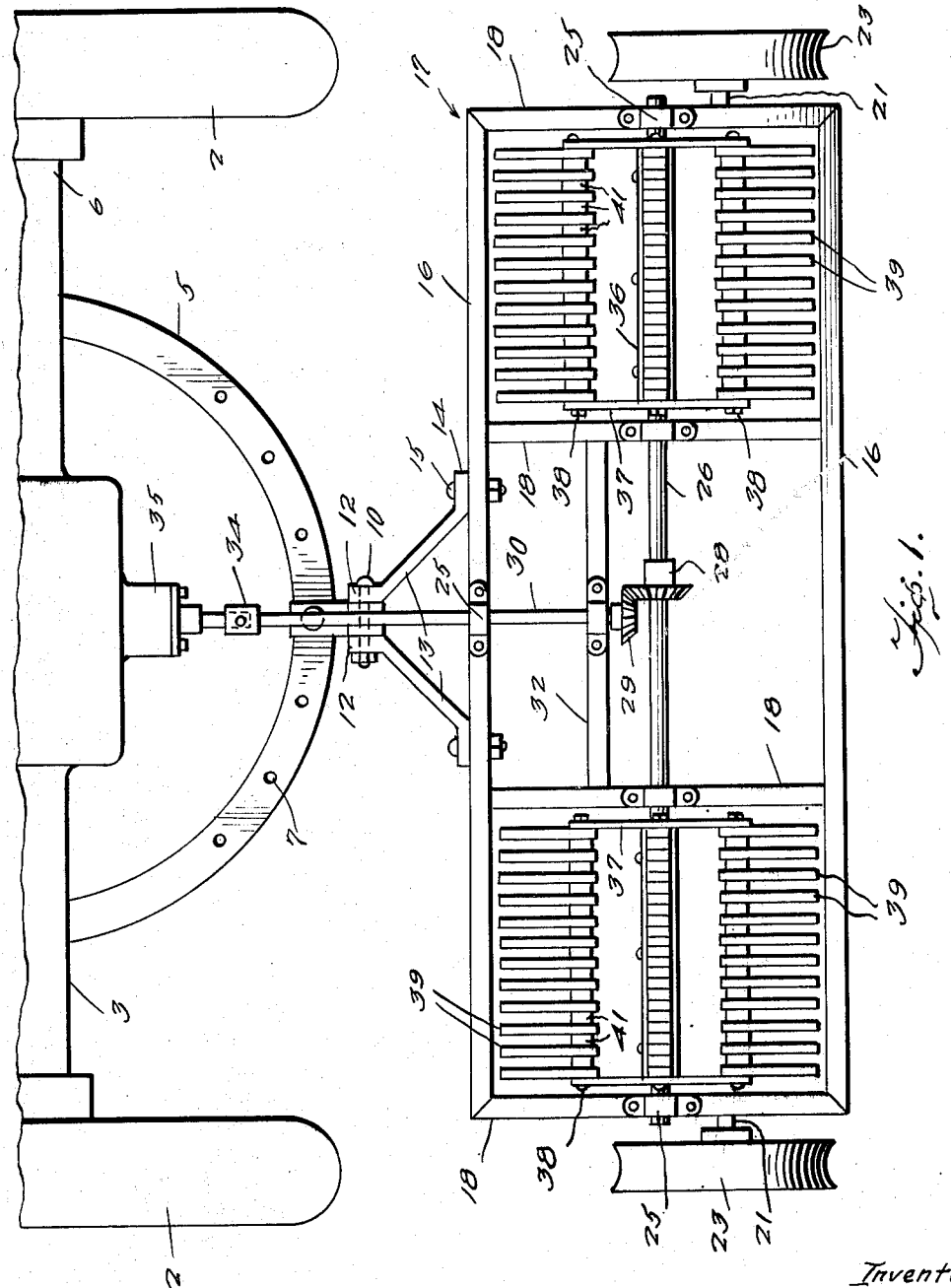

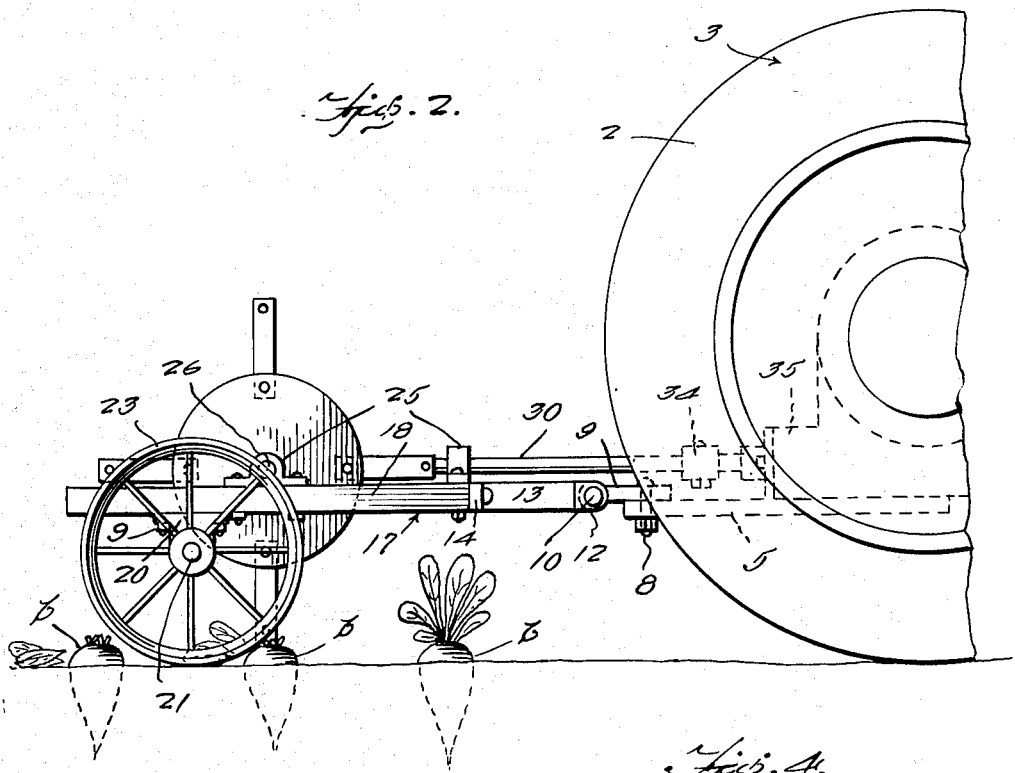
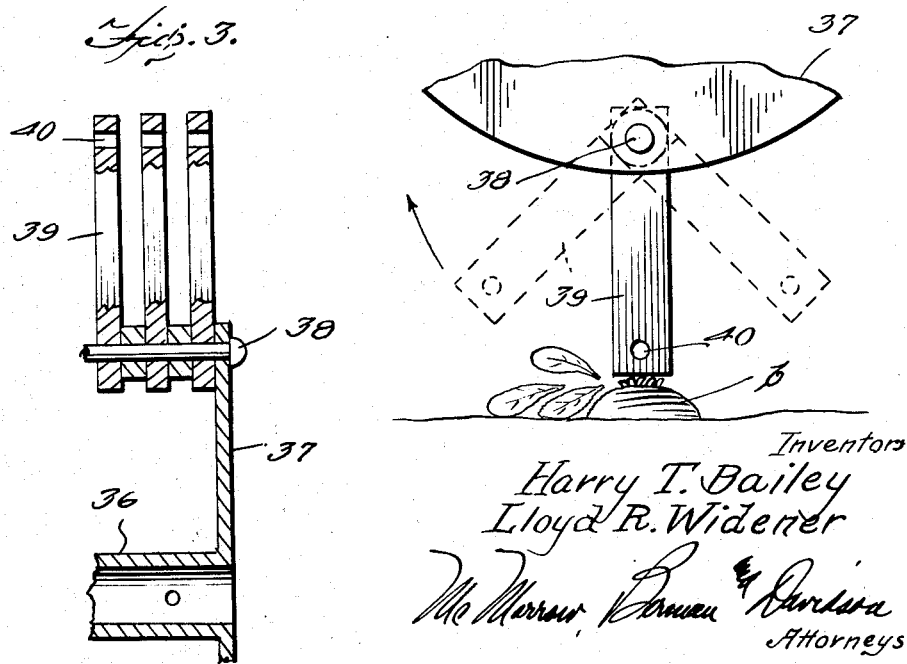

2,505,089

UNITED STATES PATENT OFFICE 2,505,089

BEET TOPPER

Harry T. Bailey and Lloyd R. Widener, Clarksburg, Calif.

Application October 5, 1945, Serial No. 620,498

1 Claim. (Cl. 56—26)

This instant invention relates to beet toppers and its primary object is the provision of an implement to be towed by a tractor or pushed by a beet digger and including topping bars or chains pivoted to a rotating mechanism which receives its power from the tractor or digger.

A further object of the invention is to produce a simple and inexpensive device and yet one which will be exceedingly effective for the purpose for which it is designed.

With these and other objects in view the invention resides in the novelty of construction, combination and arrangement of parts hereinafter specifically described and particularly claimed in the appended claim.

The description should be read in connection with the accompanying drawings which are part of this application for Letters Patent and in which:

Figure 1 is a top plan view of the preferred embodiment of my invention.

Figure 2 is a side elevation.

Figure 3 is an enlarged diametral detail section through a fragment of one of the drums, the sleeve integral therewith and a few of the toppers associated therewith.

Figure 4 is a fragmentary detail end view of the drum and the toppers.

Referring now specifically to the drawings in which like characters of reference designate like or similar parts, 2 indicates either of the rear ground wheels of a tractor 3 which is intended to tow the implement to be described. The same may also be pushed by any ordinary beet puller and is provided with wheels to be described which may be dispensed with if the implement is rigidly and adjustably supported by the rear end of the towing vehicle (not shown). The adjustment may be made by a lever (not shown).

The tractor is provided with a semi-circular draw bar 5 attached at its front ends to the rear axle housing 6 and provided with a plurality of spaced openings 7 in one of which is inserted a coupling bolt 8 also inserted in a pull link 9. The same bar at its rear end has a horizontal opening for a second coupling bolt 10 also inserted in a pair of registering openings formed in the parallel front portions 12 of bracket arms 13 which diverge rearwardly and terminate in aligned rear portions 14 fastened by bolts 15 to the front member 16 of a frame 17.

The frame is substantially rectangular and includes a rear member 16 and a pair of shorter side members 18. To the lower side of either side bar is secured by bolts 19 an axle bearing 20 for a stub axle 21. To the outer end of either stub axle is secured a ground wheel 23.

Either side bar also carries upon its top side and somewhat forwardly of the stub axles a shaft bearing 25 for a shaft 26 which is also journaled in similar bearings carried by a pair of spaced intermediate bars 18.

The shaft 26 carries somewhat to the right of its midpoint a bevel gear 28 in mesh with a bevel gear 29 fixed to the rear end of a drive shaft 30. The same is journaled in a bearing 25 carried by the top side of a brace 32 connected at its ends to the intermediate frame members and also in a bearing 25 attached to the top side of the front frame member.

The drive shaft extends forwardly and above the coupling structure described into a shaft coupling 34 whereby such shaft is connected to a power take-off 35 or other source of power on the tractor.

Either section of shaft 26 extending between a side and intermediate frame member is inserted and secured to a sleeve 36 carrying at either end a disc 37. Each pair or discs carries a plurality of spaced supporting rods 38 near their peripheries. Each rod is inserted in one end of a plurality of topping or stripping bars 39 which have pivot holes 40 at either end and are spaced from one another by spacing blocks 41.

A semi-cylindrical cover (not shown) may be mounted upon the upper side of the frame and may be connected at its middle portion with a blower (not shown) for removing the topped foilage.

Short lengths of chains (not shown) may be substituted for the topping or stripping bars and used during the early part of the season and while the leaves of the beets are tender.

While the implement is towed over the ground planted with beets, the topping bars or chains hit the leaves of the beets with such considerable force as to separate the leaves which may then be sucked in by the blower. The frame 17, providing as it does, a separate division at each end for each stripping unit, and the center division for the drive means, is well adapted to withstand the stresses and strains which result from the particular mechanical actions involved in the beet topper.

While the specification sets forth in detail the present and preferred construction of the device, still in practice such deviations from such detail may be resorted to as do not form a departure from the spirit of the invention as defined by the appended claim.

What we claim as new and desire to protect by Letters Patent of the United States is as follows:

A beet topper comprising a substantially rectangular frame, a pair of intermediate bars on the frame parallel with the sides thereof and dividing the frame into three divisions, a shaft rotatably carried by said frame and extending normally to said bars, a drum member mounted on said shaft in each of the end divisions, closely-spaced bar-like stripping members swingably mounted on the drum members, drive means in the center division and having drive connection with said drums, and ground wheels journaled to the sides of the frame for supporting the frame.

HARRY T. BAILEY.
LLOYD R. WIDENER.

REFERENCES CITED

The following references are of record in the file of this patent:

UNITED STATES PATENTS

| Number | Name | Date |
|---|---|---|
| 1,513,737 | Bohman | Nov. 4, 1924 |
| 1,870,932 | Sternemann | Aug. 9, 1932 |
| 2,061,791 | Davenport | Nov. 24, 1936 |
| 2,250,948 | Garst | July 29, 1941 |
| 2,341,486 | Swertfeger | Feb. 8, 1944 |

FOREIGN PATENTS

| Number | Country | Date |
|---|---|---|
| 507,243 | Germany | Sept. 13, 1930 |